US010511091B2

(12) United States Patent
Teague

(10) Patent No.: US 10,511,091 B2
(45) Date of Patent: Dec. 17, 2019

(54) DYNAMIC BEAM STEERING FOR UNMANNED AERIAL VEHICLES

(71) Applicant: QUALCOMM Incorporated, San Diego, CA (US)

(72) Inventor: Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 15/388,234

(22) Filed: Dec. 22, 2016

(65) Prior Publication Data
US 2018/0019516 A1    Jan. 18, 2018

Related U.S. Application Data

(60) Provisional application No. 62/362,844, filed on Jul. 15, 2016.

(51) Int. Cl.
*H01Q 3/00* (2006.01)
*H01Q 3/08* (2006.01)
(Continued)

(52) U.S. Cl.
CPC ............... *H01Q 3/08* (2013.01); *B64D 43/00* (2013.01); *H04B 7/18504* (2013.01);
(Continued)

(58) Field of Classification Search
CPC .. H01Q 3/08; H01Q 3/34; H01Q 3/32; H01Q 3/22; H01Q 3/24; H04B 7/18504;
(Continued)

(56) References Cited

U.S. PATENT DOCUMENTS 6,018,659 A    1/2000  Ayyagari et al.
7,072,977 B1 *  7/2006  Bernard ............. B64D 11/0015
                                                709/238
(Continued)

OTHER PUBLICATIONS

International Search Report and Written Opinion—PCT/US2017/033608—SA/EPO—dated Sep. 29, 2017.
(Continued)

*Primary Examiner* — Chuong P Nguyen
(74) *Attorney, Agent, or Firm* — The Marbury Law Group, PLLC

(57) ABSTRACT

Various embodiments include methods for dynamic antenna steering on an unmanned aerial vehicle (UAV). The methods may include orienting an antenna on the UAV towards a serving ground station based on the UAV's position, orienting the antenna towards a neighboring ground station when it is time to conduct signal measurements of the neighboring ground station, conducting the signal measurements while orienting the antenna towards the neighboring ground station, and reorienting the antenna towards the serving ground station. Methods further include orienting a ground station antenna towards a UAV by obtaining a position of the UAV, calculating a vector between the position of the UAVs and the ground station, determining a direction to steer a beam based on the calculated vector, and steering the beam to the determined direction for the UAV.

13 Claims, 10 Drawing Sheets

(51) Int. Cl.
*H04B 7/185* (2006.01)
*B64D 43/00* (2006.01)
B64C 39/02 (2006.01)
H01Q 3/34 (2006.01)

(52) U.S. Cl.
CPC ........ *H04B 7/18506* (2013.01); *B64C 39/024* (2013.01); *B64C 2201/027* (2013.01); *H01Q 3/34* (2013.01); *H04B 7/18508* (2013.01)

(58) Field of Classification Search
CPC ........ H04B 7/155; B64C 39/024; B64D 3/00; B64D 43/00
USPC .................................................. 342/359, 372
See application file for complete search history.

(56) References Cited

U.S. PATENT DOCUMENTS

| | | | | |
|---|---|---|---|---|
| 7,636,552 B2* | 12/2009 | Monk | ................ | H04B 7/18506 342/359 |
| 7,801,521 B2* | 9/2010 | Dent | ................ | H04B 7/18506 342/57 |
| 8,503,941 B2 | 8/2013 | Erdos et al. | | |
| 9,306,657 B2* | 4/2016 | de La Chapelle | ........................... | H04B 7/18506 |
| 9,467,922 B1* | 10/2016 | Buchmueller | ..... | H04B 7/18506 |
| 9,590,298 B1* | 3/2017 | Buchmueller | ........... | H01Q 3/08 |
| 9,660,718 B2* | 5/2017 | Jalali | ................... | H04B 7/18504 |
| 9,800,320 B2* | 10/2017 | Jalali | ................... | H04B 7/18504 |
| 9,853,713 B2* | 12/2017 | Jalali | ................... | H04B 7/18502 |
| 9,980,267 B2* | 5/2018 | Jalali | ................... | H04B 7/18502 |
| 9,998,975 B1* | 6/2018 | Buchmueller | ..... | H04B 7/18506 |
| 10,090,909 B2* | 10/2018 | Peitzer | ................ | H04B 7/18506 |
| 2006/0030311 A1* | 2/2006 | Cruz | ..................... | H01Q 1/246 455/431 |
| 2009/0100476 A1 | 4/2009 | Frisco et al. | | |
| 2011/0034190 A1* | 2/2011 | Leabman | ................ | H01Q 1/246 455/500 |
| 2014/0292578 A1 | 10/2014 | Ibrahim et al. | | |
| 2015/0236778 A1* | 8/2015 | Jalali | ..................... | H04W 84/06 370/316 |
| 2015/0236779 A1 | 8/2015 | Jalali | | |
| 2016/0013858 A1 | 1/2016 | Jalali et al. | | |
| 2016/0205560 A1 | 7/2016 | Hyslop et al. | | |
| 2017/0187450 A1* | 6/2017 | Jalali | ..................... | H04W 84/06 |
| 2017/0359106 A1* | 12/2017 | John Wilson | ........ | H04B 17/318 |
| 2018/0262265 A1* | 9/2018 | Hyslop | ............. | H04B 7/18506 |
| 2018/0375568 A1* | 12/2018 | De Rosa | ............. | H04B 7/18506 |

OTHER PUBLICATIONS

Partial International Search Reportz—PCT/US2017/033608—ISA/EPO—dated Aug. 11, 2017.

* cited by examiner

DYNAMIC BEAM STEERING FOR UNMANNED AERIAL VEHICLES

RELATED APPLICATIONS

This application claims the benefit of priority to U.S. Provisional Application No. 62/362,844 entitled "Dynamic Beam Steering for Unmanned Aerial Vehicles" filed Jul. 15, 2016, the entire contents of which are hereby incorporated by reference.

BACKGROUND

Unmanned aerial vehicles (UAVs), or drones, are used in a number of different applications. For example, drones may be used to deliver first aid and other supplies in emergency situations, transporting goods for commercial applications, surveying land, capturing photographs and videos, police and security monitoring, and recreational use.

UAVs often operate in environments in which the communication link is near line-of-sight to a base station or antenna on the ground, and in which free-space propagation increases interference from neighboring transmissions. These characteristics result in challenges in maintaining good link performance between UAVs and ground base stations (e.g., mobile network cell towers) that aid in navigation, and can also cause degrade performance to ground users who share the network with the UAVs.

SUMMARY

Various embodiments include methods for dynamic antenna steering on an unmanned aerial vehicle (UAV) and/or ground stations communicating with UAVs. Various embodiments may include orienting an antenna on a UAV towards a serving ground station based on a current position of the UAV, orienting the antenna towards a neighboring ground station when it is time to conduct signal measurements of the neighboring ground station, conducting the signal measurements of the neighboring ground station while orienting the antenna towards the neighboring ground station, and reorienting the antenna on the UAV towards the serving ground station.

In some embodiments, orienting the antenna on the UAV towards the serving ground station based on the current position of the UAV may include obtaining a location of the serving ground station, calculating a vector between the location of the serving ground station and the current position of the UAV, in which the current position of the UAV includes a three dimensional coordinate and an orientation, determining an orientation for the antenna that points to the location of the serving ground station based on the vector, and adjusting the antenna to the determined orientation. In some embodiments, the serving ground station may transmit its location to the UAV. In some embodiments, the location of the serving ground station may be stored on the UAV.

In some embodiments, adjusting the antenna to the determined orientation may include mechanically steering the antenna. In some embodiments, adjusting the antenna to the determined orientation may include electronically steering the antenna. In some embodiments, adjusting the antenna to the determined orientation may include adjusting an orientation of the UAV. In some embodiments, the orientation of the UAV may include at least one of a pitch, a roll, and a yaw of the UAV.

Some embodiments may further include determining whether it is time to report the signal measurements to a network, and reporting the signal measurements to the network via the serving ground station in response to determining that it is time to report the signal measurements to a network. Some embodiments may further include determining whether it is time to report the signal measurements to a network, orienting the antenna to the neighboring ground station in response to determining that is time to report the signal measurements to the network, and reporting the signal measurements to the network via the neighboring ground station.

Some embodiments may further include determining whether the UAV should perform a handover to the neighboring ground station based on the signal measurements, and performing the handover to the neighboring ground station in response to determining that the UAV should perform the handover to the neighboring ground station. In some embodiments, orienting the antenna towards the neighboring ground station may include obtaining a location of the neighboring ground station, calculating a vector between the location of the neighboring ground station and the current position of the UAV, in which the current position of the UAV includes a three dimensional coordinate and an orientation, determining an orientation for the antenna that points to the location of the neighboring ground station based on the vector, and adjusting the antenna to the determined orientation.

Various additional embodiments include methods for dynamic beam steering at a ground station. Various embodiments may include obtaining a position of one or more unmanned aerial vehicles (UAVs), in which the position of each of the one or more UAVs includes a three dimensional coordinate, calculating a vector between the position of each of the one or more UAVs and a location of the ground station, determining, for each of the one or more UAVs, a direction to steer a beam based on the vector between the ground station and the respective UAV, and steering the beam to the determined direction for each of the one or more UAVs.

Some embodiments may further include determining, for each of the one or more UAVs, a time to steer the beam to a respective one of the one or more UAVs, in which steering, for each of the one or more UAVs, the beam to the determined direction is performed at the time determined for each of the respective one or more UAVs. Some embodiments may further include determining, for each of the one or more UAVs, a second time for receiving signal measurements, steering the beam to one of the one or more UAVs at the second time for receiving signal measurements from that UAV, and receiving the signal measurements from the UAV. In some embodiments, the ground station may include a plurality of antennas for steering the beam to each of the one or more UAVs.

Further embodiments include a UAV including a processor configured with processor-executable instructions to perform operations of the methods summarized above. Further embodiments include a non-transitory processor-readable storage medium having stored thereon processor-executable software instructions configured to cause a processor of a UAV to perform operations of the methods summarized above. Further embodiments include a UAV that includes means for performing functions of the operations of the methods summarized above.

Further embodiments include a ground station including a processor configured with processor-executable instructions to perform operations of the methods summarized above.

Further embodiments include a non-transitory processor-readable storage medium having stored thereon processor-executable software instructions configured to cause a processor of a ground station to perform operations of the methods summarized above. Further embodiments include a ground station that includes means for performing functions of the operations of the methods summarized above.

BRIEF DESCRIPTION OF THE DRAWINGS

The accompanying drawings, which are incorporated herein and constitute part of this specification, illustrate exemplary embodiments of the claims, and together with the general description and the detailed description given herein, serve to explain the features of the claims.

DETAILED DESCRIPTION

Figure 1:
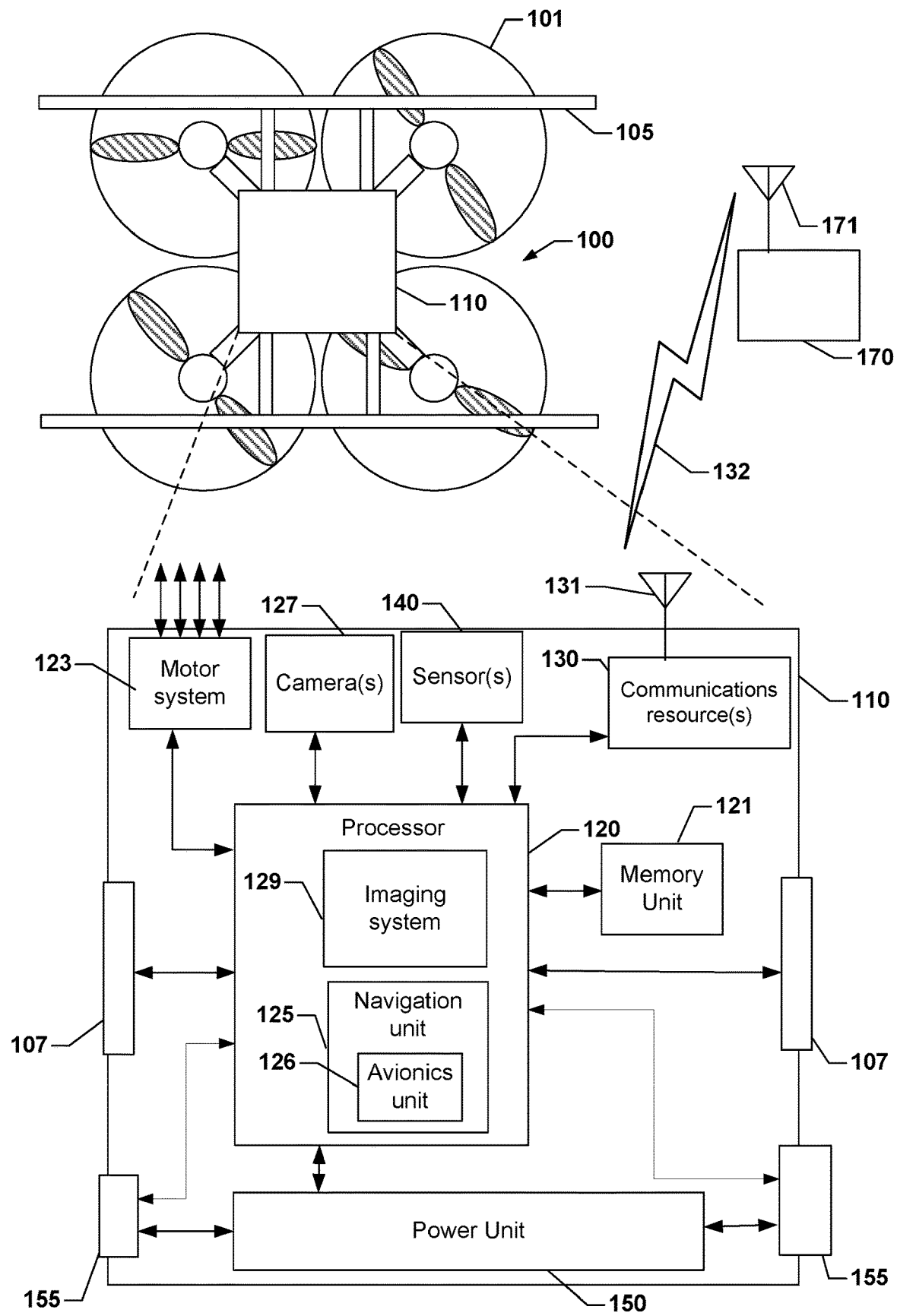
FIG. 1 is a block diagram illustrating components of a typical unmanned aerial vehicle system suitable for use in various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

UAVs may communicate with various ground stations, such as mobile telephony network base stations (or cell towers) to transmit and receive information via radio frequency (RF) communication beams. For example, UAVs may receive navigation information from ground stations, and may report its location to a UAV controller via the ground station. However, as a UAV travels its position relative to the ground station changes. In addition, winds and flight maneuvers may cause the UAV to change its orientation (i.e., pitch, roll, and/or yaw) during flight. Thus, an antenna on the UAV that receives and transmits beams with the ground station may not always be oriented to face the ground station due to changes in position and/or orientation of the UAV, resulting in a loss of signal strength. There may also be interference of the beam from various sources, such as neighboring electromagnetic transmissions or intervening structures.

Various systems and methods described herein provide a UAV and a ground station with dynamic beam steering that adjusts as the UAV moves relative to the ground station. At the UAV, the various methods may include obtaining a location of a ground station (e.g., a serving ground station that supports a communications link between the UAV and a network, or a neighboring ground station operated by the network), calculating a vector between the location of the ground station and the position of the UAV, determining an orientation for the antenna that points to the location of the ground station based on the vector, and adjusting the antenna to the determined orientation. The ground station may transmit its location to the UAV or the location of the ground station may be stored on the UAV. The antenna may be adjusted mechanically (e.g., via a gimbal) or electronically (e.g., via a phased array), or the entire UAV itself may adjust its orientation so that the antenna points toward the ground station.

The UAV and the network may determine time periods for the UAV to conduct signal measurements of neighboring ground stations. During these time periods, the antenna of the UAV may be oriented to point towards a neighboring ground station. The neighboring ground station may also steer a beam towards the UAV. The UAV may conduct signal measurements of the received beam during the determined time periods, after which the antenna on the UAV may be oriented back to the serving ground station. The UAV and the network may also determine time periods for the UAV to report the signal measurements to the network via either the serving ground station or a neighboring ground station. The signal measurements may be used to determine whether a handover should be performed from the serving ground station to a neighboring ground station.

At the ground station, the various methods may include determining time periods to transmit beams to one or more UAVs, determining time periods for receiving signal measurements from one or more UAVs, obtaining a position of each UAV, calculating a vector between the location of the ground station and the position of each UAV, determining a direction to steer a beam to each UAV based on the vector, steering the beam(s) to each UAV based on the determined direction during the determined time periods for transmitting the beam, and receiving the signal measurements at the determined time periods for receiving the signal measurements.

UAVs may be winged or rotorcraft varieties. FIG. 1 illustrates an example UAV 100 for use with various embodiments disclosed herein. The UAV 100 is a "quad copter" having four horizontally configured rotary lift propellers, or rotors 101 and motors fixed to a frame 105. The frame 105 may support a control unit 110, landing skids and the propulsion motors, power source (power unit 150) (e.g., battery), payload securing mechanism (payload securing unit 107), and other components. The rotors 101 are driven by corresponding motors to provide lift-off (or take-off) as well as other aerial movements (e.g., forward progression, ascension, descending, lateral movements, tilting, rotating, etc.). The UAV 100 is illustrated as an example of a UAV that may utilize various embodiments, but is not intended to imply or require that various embodiments are limited to rotorcraft UAVs. Instead, various embodiments may be used with winged UAVs as well. Further, various embodiments may equally be used with land-based autonomous vehicles, water-borne autonomous vehicles, and space-based autonomous vehicles.

The UAV 100 may be provided with a control unit 110. The control unit 110 may include a processor 120, communication resource(s) 130, sensor(s) 140, and a power unit 150. The processor 120 may be coupled to a memory unit 121 and a navigation unit 125. The processor 120 may be configured with processor-executable instructions to control flight and other operations of the UAV 100, including operations of various embodiments. In some embodiments, the processor 120 may be coupled to a payload securing unit 107 and landing unit 155. The processor 120 may be powered from the power unit 150, such as a battery. The processor 120 may be configured with processor-executable instructions to control the charging of the power unit 150, such as by executing a charging control algorithm using a charge control circuit. Alternatively or additionally, the power unit 150 may be configured to manage charging. The processor 120 may be coupled to a motor system 123 that is configured to manage the motors that drive the rotors 101. The motor system 123 may include one or more propeller drivers. Each of the propeller drivers includes a motor, a motor shaft, and a propeller.

Through control of the individual motors of the rotors 101, the UAV 100 may be controlled in flight. In the processor 120, a navigation unit 125 may collect data and determine the present position and orientation of the UAV 100, the appropriate course towards a destination, and/or the best way to perform a particular function.

An avionics component 126 of the navigation unit 125 may be configured to provide flight control-related information, such as altitude, attitude, airspeed, heading and similar information that may be used for navigation purposes. The avionics component 126 may also provide data regarding the orientation and accelerations of the UAV 100 that may be used in navigation calculations. In some embodiments, the information generated by the navigation unit 125, including the avionics component 126, depends on the capabilities and types of sensor(s) 140 on the UAV 100.

The control unit 110 may include at least one sensor 140 coupled to the processor 120, which can supply data to the navigation unit 125 and/or the avionics component 126. For example, sensors 140 may include inertial sensors, such as one or more accelerometers (providing motion sensing readings), one or more gyroscopes (providing rotation sensing readings), one or more magnetometers (providing direction sensing), or any combination thereof. Sensors 140 may also include Global Positioning System (GPS) receivers, barometers, thermometers, audio sensors, motion sensors, etc. Inertial sensors may provide navigational information, e.g., via dead reckoning, including at least one of the position, orientation (i.e., pitch, roll, and/or yaw), and velocity (e.g., direction and speed of movement) of the UAV 100. A barometer may provide ambient pressure readings used to approximate elevation level (e.g., absolute elevation level) of the UAV 100.

In some embodiments, the communication resource(s) 130 may include a GPS receiver, enabling Global Navigation Satellite System (GNSS) signals to be provided to the navigation unit 125. A GPS or GNSS receiver may provide three-dimensional coordinate information to the UAV 100 by processing signals received from three or more GPS or GNSS satellites. GPS and GNSS receivers can provide the UAV 100 with an accurate position in terms of latitude, longitude, and altitude, and by monitoring changes in position over time, the navigation unit 125 can determine direction of travel and speed over the ground as well as a rate of change in altitude. In some embodiments, the navigation unit 125 may use an additional or alternate source of positioning signals other than GNSS or GPS. For example, the navigation unit 125 or one or more communication resource(s) 130 may include one or more radio receivers configured to receive navigation beacons or other signals from radio nodes, such as navigation beacons (e.g., very high frequency (VHF) omnidirectional range (VOR) beacons), Wi-Fi access points, cellular network base stations, radio stations, etc. In some embodiments, the navigation unit 125 of the processor 120 may be configured to receive information suitable for determining position from the communication resources(s) 130. In some embodiments, the UAV 100 may use an alternate source of positioning signals (i.e., other than GNSS, GPS, etc.). Because UAVs often fly at low altitudes (e.g., below 400 feet), the UAV 100 may scan for local radio signals (e.g., Wi-Fi signals, Bluetooth signals, cellular signals, etc.) associated with transmitters (e.g., beacons, Wi-Fi access points, Bluetooth beacons, small cells (picocells, femtocells, etc.), etc.) having known locations such as beacons or other signal sources within restricted or unrestricted areas near the flight path. The navigation unit 125 may use location information associated with the source of the alternate signals together with additional information (e.g., dead reckoning in combination with last trusted GNSS/GPS location, dead reckoning in combination with a position of the UAV takeoff zone, etc.) for positioning and navigation in some applications. Thus, the UAV 100 may navigate using a combination of navigation techniques, including dead-reckoning, camera-based recognition of the land features below and around the UAV 100 (e.g., recognizing a road, landmarks, highway signage, etc.), etc. that may be used instead of or in combination with GNSS/GPS location determination and triangulation or trilateration based on known locations of detected wireless access points.

The control unit 110 may include at least one camera 127 and an imaging system 129. The imaging system 129 may be implemented as part of the processor 120, or may be implemented as a separate processor, such as an application specific integrated circuit (ASIC), a field programmable gate array (FPGA), or other logical circuitry. For example, the imaging system 129 may be implemented as a set of executable instructions stored in the memory unit 121 that execute on a processor 120 coupled to the at least one camera 127. Each of the cameras 127 may include subcomponents other than image or video capturing sensors, including auto-focusing circuitry, International Organization for Standardization (ISO) adjustment circuitry, and shutter speed adjustment circuitry, etc.

The control unit 110 may include communication resource(s) 130, which may be coupled to at least one antenna 131 and include one or more transceivers. The transceiver(s) may include any of modulators, de-modulators, encoders, decoders, encryption modules, decryption modules, amplifiers, and filters. The communication resource(s) 130 may be capable of device-to-device communication with other UAVs, wireless communication devices carried by a user (e.g., a smartphone), a UAV controller, ground stations such as mobile telephony network base stations, and other devices or electronic systems. The orientation of the antenna 131 may be controlled by the processor 120. For example, the antenna may be attached to the UAV 100 via a gimbal or other mechanical system that may be used to control the orientation of the antenna 131 independent of the UAV 100. In other examples, the antenna 131 may include a phased array or another electronic system that enables beam steering in various directions.

The processor 120 and/or the navigation unit 125 may be configured to communicate through the communication resource(s) 130 with a ground station 170 through a wireless connection (e.g., a cellular data network) to receive and transmit information with the ground station 170.

The ground station 170 may be, for example, a mobile telephony network base station (e.g., an eNodeB), a UAV controller, a server, or some other electronic system that may provide the UAV 100 with navigation assistance and other information, and receive information from the UAV 100. In some embodiments, a UAV controller may communicate with the UAV 100 through the ground station 170. A bi-directional wireless communication link 132 may be established between the antenna 131 of the communication resource(s) 130 and one or more antennas 171 of the ground station 170. The ground station 170 may form and steer wireless communication beams to the UAV 100 through the antennas 171. The ground station 170 may also be able to receive communication beams from the UAV 100 through the antennas 171.

In some embodiments, the communication resource(s) 130 may be configured to switch between a cellular connection and a Wi-Fi connection depending on the position and altitude of the UAV 100. For example, while in flight at an altitude designated for UAV traffic, the communication resource(s) 130 may communicate with a cellular infrastructure in order to maintain communications with the ground station 170. For example, the UAV 100 may be configured to fly at an altitude of about 400 feet or less above the ground, such as may be designated by a government authority (e.g., the Federal Aviation Administration) for UAV flight traffic. At this altitude, it may be difficult to establish communication links with the ground station 170 using short-range radio communication links (e.g., Wi-Fi). Therefore, communications with the ground station 170 may be established using cellular telephone networks while the UAV 100 is at flight altitude. Communications with the ground station 170 may transition to a short-range communication link (e.g., Wi-Fi or Bluetooth) when the UAV 100 moves closer to the ground station 170.

While the various components of the control unit 110 are illustrated in FIG. 1 as separate components, some or all of the components (e.g., the processor 120, the motor system 123, the communication resource(s) 130, and other units) may be integrated together in a single device or unit, such as a system-on-chip. The UAV 100 and the control unit 110 may also include other components not illustrated in FIG. 1.

Figure 2:
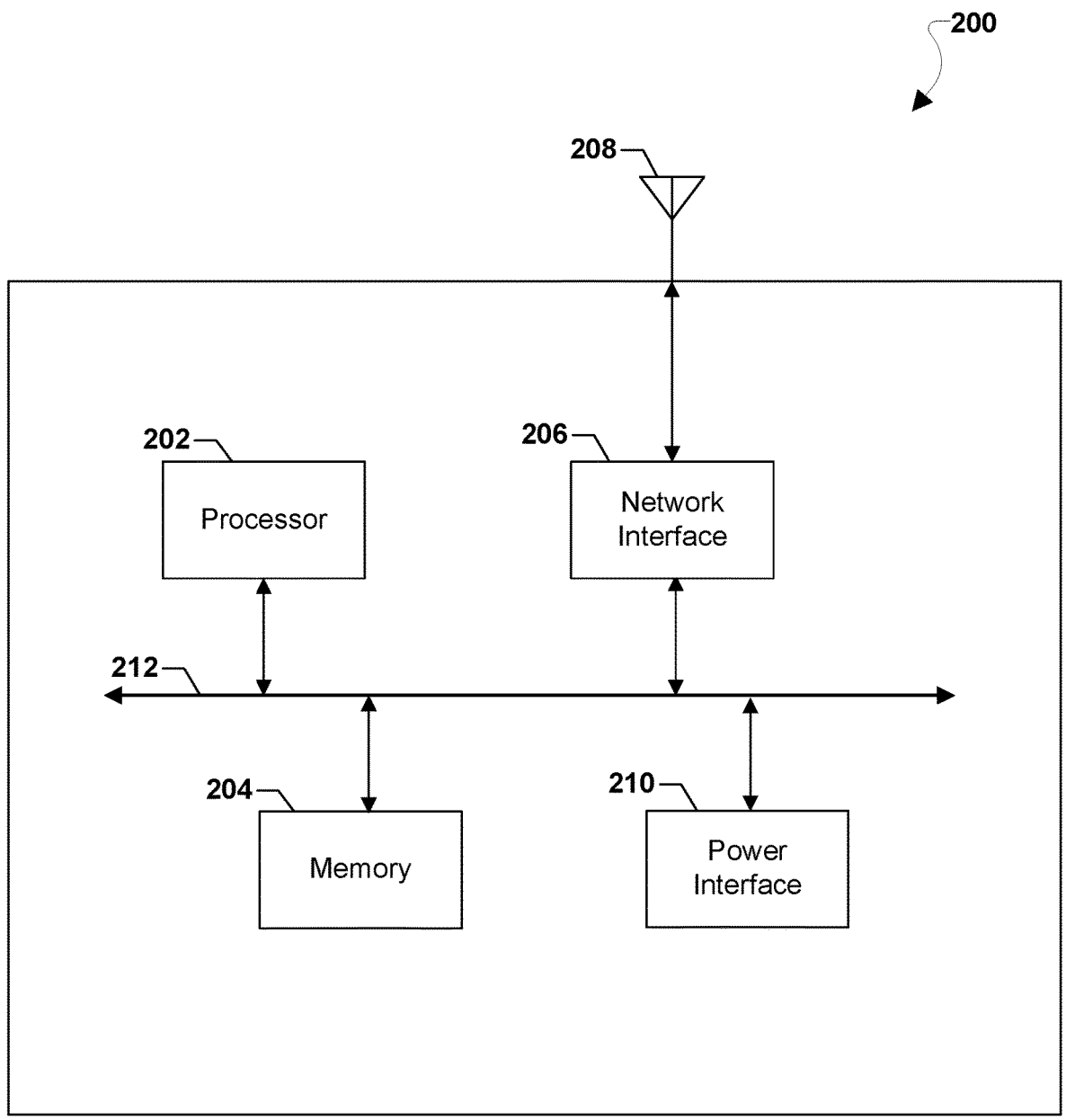
FIG. 2 is a block diagram illustrating components of a ground station suitable for use in various embodiments.

FIG. 2 is a functional block diagram of a ground station 200 suitable for implementing various embodiments. With reference to FIGS. 1-2, the ground station 200 may be a mobile telephony network base station (e.g., an eNodeB), a UAV controller, a server, or another electronic system that may provide navigation assistance and other information to one or more UAVs (e.g., the UAV 100). The ground station 200 may include a processor 202 for executing software instructions. The ground station 200 may include a memory 204 for storing code and data. For example, the memory 204 may store navigation data and other information that may be transmitted to a UAV. In some embodiments, the ground station 200 may communicate with a UAV controller that provides the navigation information to the UAV. The memory 204 may include one or more of random access memory (RAM), dynamic RAM (DRAM), static RAM (SRAM), read only memory (ROM), electrically erasable programmable ROM (EEPROM), or other types of non-transitory computer-readable storage media.

The ground station 200 may include a network interface 206. The network interface 206 may be used to communicate with UAVs and other devices or vehicles over a communications network, such as a wireless wide area network (WWAN) (e.g., a mobile telephony network) or a local area network (e.g., Wi-Fi). The network interface 206 may be connected to one or more antennas 208 to transmit and receive communication beams with the UAVs. The processor 202, in conjunction with the network interface 206, may form RF communication beams and steer antennas 208 to direct the beam to the UAVs. The ground station 200 may also include a power interface 210 for providing power to the ground station 200. The ground station 200 may include a bus 212 that connects the various components of the ground station 200 together.

The ground station 200 may also include various other components not illustrated in FIG. 2. For example, the ground station 200 may include a number of processing components such as modems, transceivers, subscriber identification module (SIM) cards, additional processors, additional hard drives, universal serial bus (USB) ports, Ethernet ports, and/or other types of wired or wireless input/output ports, keyboard, mouse, speaker, microphone, display screen, touchscreen, and many other components known in the art.

Figure 3A:
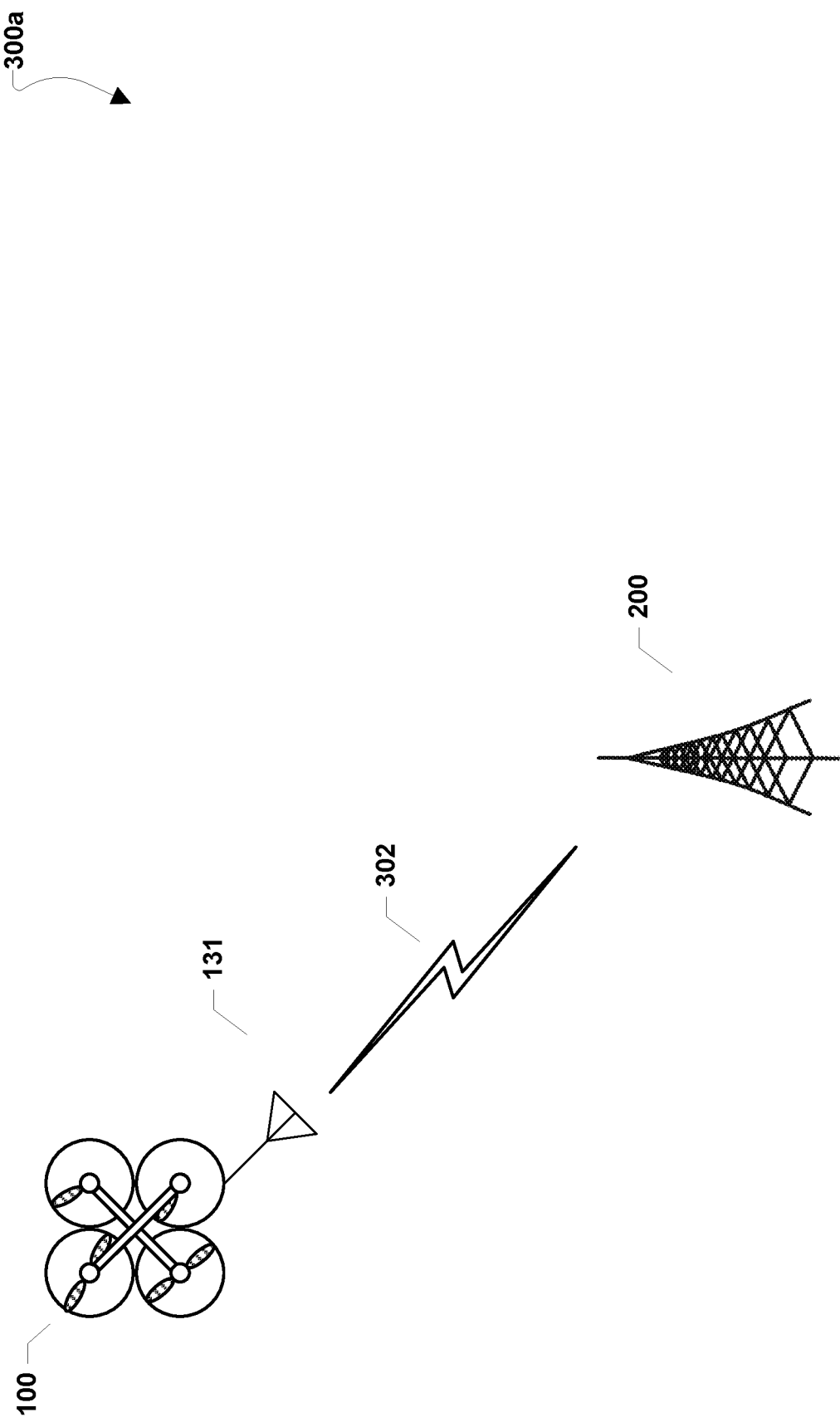
FIGS. 3A-3B are block diagrams illustrating dynamic beam steering between a UAV and a ground station according to various embodiments.
Figure 3B:
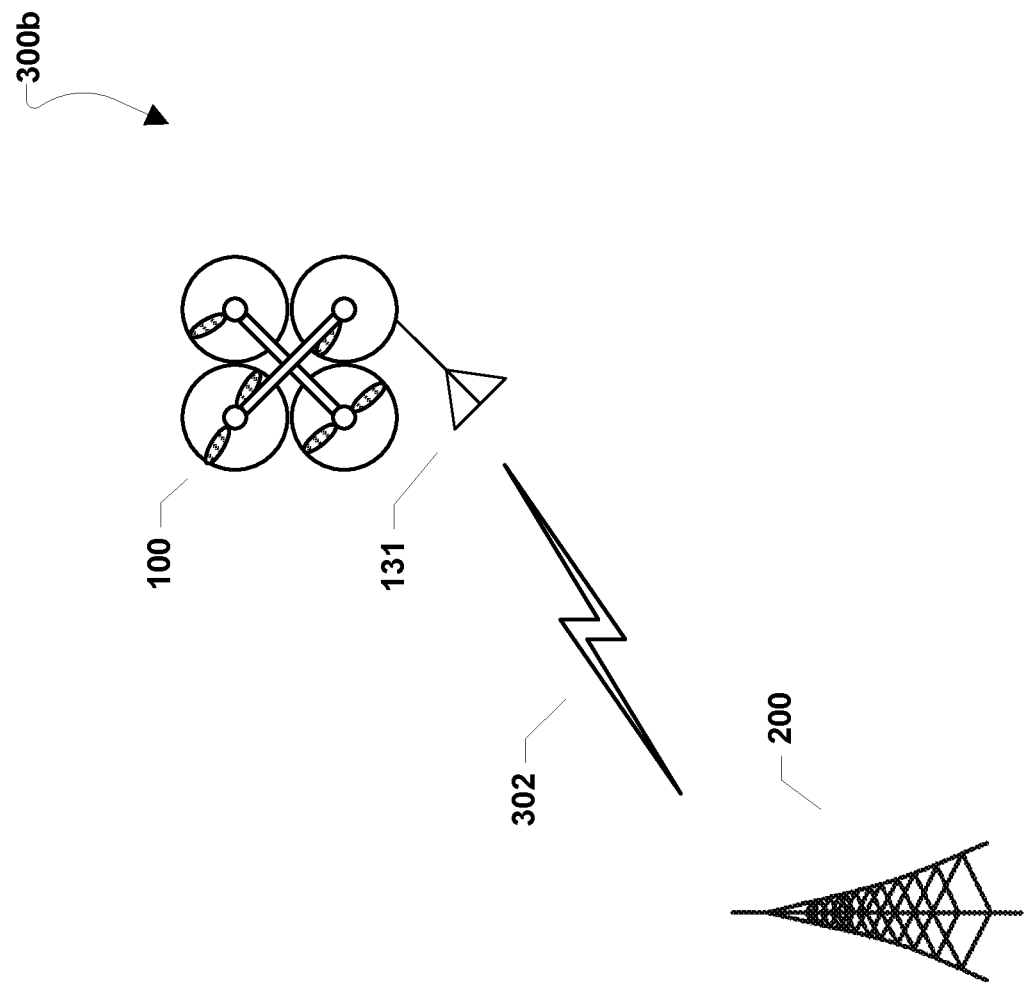

FIGS. 3A-3B are diagrams illustrating dynamic beam steering between a UAV and a ground station according to various embodiments. With reference to FIGS. 1-3B, the diagram 300a includes the ground station 200 and the UAV 100. The ground station 200 may be the serving ground station for the UAV 100. In other words, the UAV 100 may communicate with a network (e.g., a mobile telephony network) via the ground station 200 to receive and transmit information. The UAV 100 may be traveling along a certain path so that the direction to the ground station 200 varies over time. In addition, shifts in the orientation of the UAV 100 due to flight maneuvers may change the pointing direction of the antenna 131. To compensate, the antenna 131 on the UAV 100 may form and steer beams to communicate with the ground station 200. Likewise, antennas on the ground station 200 may be configured to form and steer the beams to communicate with the UAV 100, establishing a bi-directional communications link 302.

The UAV 100 may be configured to obtain and track the position of the ground station 200 relative to the UAV 100. For example, the UAV 100 may store the location of the ground station 200 in a database, or the UAV 100 may request that the ground station 200 transmit its location to the UAV 100. The location of the ground station 200 may be expressed as three dimensional coordinates, for example as a latitude, a longitude, and an altitude.

The UAV 100 may then determine its own position using GPS or other geographical location systems. The position of the UAV 100 may be a set of three dimensional coordinates and an orientation, such as a latitude, a longitude, an altitude, and an orientation (i.e., pitch, roll, and yaw measures). The UAV 100 may then determine an orientation of the antenna 131 so that it points to the location of the ground station 200. For example, the UAV 100 may calculate a vector between the position of the UAV 100 and the location of the ground station 200. The antenna 131 may then be oriented to align with the calculated vector.

The antenna 131 may change its orientation relative to the rest of the UAV 100 using a mechanical or electronic system. For example, the antenna 131 may be attached to the UAV 100 using a mechanical gimbal that allows the antenna 131 to be oriented in any direction independent of the rest of the UAV 100. In another example, the antenna 131 may include a phased array that may be used to steer the beam of the antenna 131 to point in various directions. In some embodiments, the UAV 100 may be oriented instead of the antenna 131, or both the UAV 100 and the antenna 131 may change orientation so that the antenna 131 points to the ground station 200.

In some embodiments, the ground station 200 may be configured to dynamically steer its beam to the UAV 100. The ground station 200 may receive from the UAV 100 its position, which may include latitude, longitude, altitude, and orientation (e.g., pitch, roll, yaw), or another set of three dimensional coordinates and an orientation. The ground station 200 may calculate a vector between the position of the UAV 100 and the location of the ground station 200. In some embodiments, the UAV 100 or the ground station 200 may calculate the vector and share the result with the other device. The ground station 200 may then steer its antenna to point toward the UAV 100 through mechanical steering mechanisms or electronic steering (e.g., phased array) techniques. In this manner, the bi-directional communications link 302 that is received and transmitted by both the UAV 100 and the ground station 200 may be substantially aligned with a straight, or line-of-sight, vector between the UAV 100 and the ground station 200.

At a later point in time, the UAV 100 may have moved to a different position as illustrated in diagram 300b. The UAV 100 and/or the ground station 200 may recalculate the vector between the new position of the UAV 100 and the location of the ground station 200. The UAV 100 may re-orient the antenna 131 to continue to point to the ground station 200, and the ground station 200 may steer its beam to the new position of the UAV 100 to maintain the bi-directional communications link 302. The UAV 100 and the ground station 200 may periodically re-determine their relative positions and align their antennas. For example, the UAV 100 and the ground station 200 may adjust their antennas every few seconds to maintain dynamic beam steering. This dynamic beam steering may increase the signal strength of the bi-directional communications link 302 between the UAV 100 and the ground station 200, and minimize interference from other transmission sources.

The UAV 100 may also periodically scan and conduct signal measurements from neighboring ground stations. The UAV 100 may receive signals (e.g., broadcast pilot, preamble, etc.) from other ground stations that are detectable, and report signal measurements based on these received signals to the network (e.g., the mobile telephony network of the ground station 200). These reports may be used to control handover, neighbor-list management and other mobility features. During the signal measurements, the UAV 100 may modify its beam direction as appropriate to detect signals from neighboring ground stations perform such signal measurements. For example, the UAV 100 may switch to a non-directional beam to receive the signal measurements, which may be done quickly when the antenna 131 includes a phased-array for beam steering. If the UAV 100 or the network determines that a handover should be performed (e.g., if the UAV 100 moves away from the ground station 200 and closer to a neighboring ground station), the UAV 100 may switch the beam direction of the antenna 131 to the new ground station.

Figure 4:
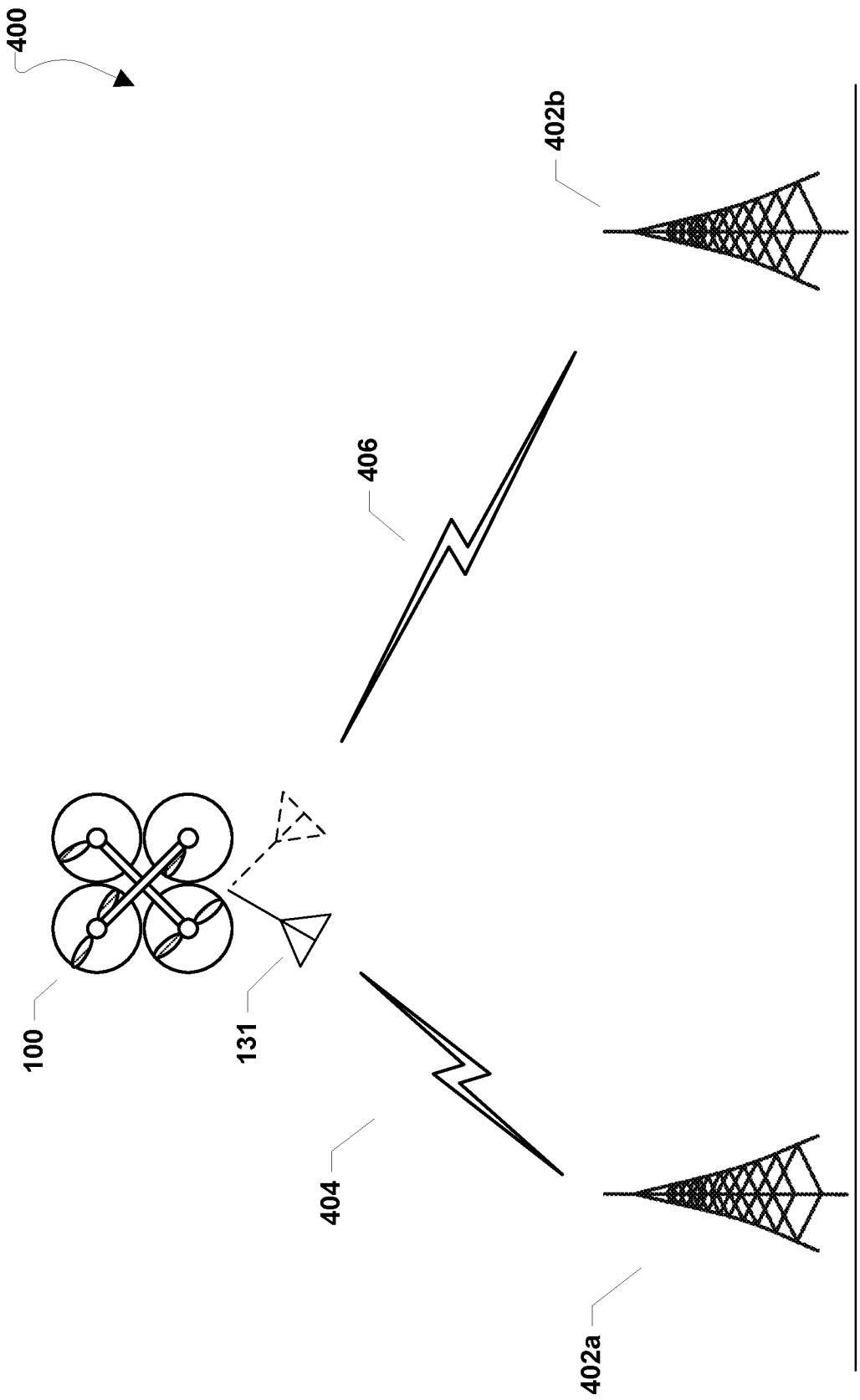
FIG. 4 is a block diagram illustrating a handover on a UAV between two ground stations according to various embodiments.

FIG. 4 includes a diagram 400 illustrating handovers between a UAV and two ground stations according to various embodiments. With reference to FIGS. 1-4, the diagram 400 includes a serving ground station 402a (i.e., a ground station with which the UAV 100 is currently communicating) and a neighboring ground station 402b. Each of the ground stations 402a, 402b may be similar to the ground station 200. The ground stations 402a, 402b may be operated by the same network. The UAV 100 may be actively communicating with the network via the serving ground station 402a, sending and receiving information.

The UAV 100 may be traveling away from the serving ground station 402a and toward the neighboring ground station 402b. As the UAV 100 travels away from the serving ground station 402a, the signal strength of the bi-directional communications link 404 may decrease. At the same time, as the UAV 100 travels towards the neighboring ground station 402b, the UAV 100 may be able to acquire a stronger signal from the neighboring ground station 402b. Thus, as the UAV 100 approaches the neighboring ground station 402b, the UAV 100 and/or the network may hand over the communications link with the UAV 100 from the serving ground station 402a to the neighboring ground station 402b, which will then become the serving ground station.

The UAV 100 and the ground stations 402a, 402b may implement dynamic beam steering during the handover process. For example, the antenna 131 on the UAV 100 may be dynamically steered towards the serving ground station 402a as described with reference to the diagrams 300a, 300b. In order to perform a handover, the UAV 100 may conduct signal measurements of any neighboring ground stations, including the neighboring ground station 402b. The network and the UAV 100 may determine one or more time periods during which the UAV 100 may steer the antenna 131 towards the neighboring ground station 402b in order to conduct signal measurements.

At a determined time, the UAV 100 may dynamically steer the antenna 131 towards the neighboring ground station 402b and conduct signal measurements during the determined time period. To do so, the UAV 100 may first obtain the position of the neighboring ground station 402b. For example, the UAV 100 may recall the location of the neighboring ground station 402b from a database in which network ground station locations are stored. As another example, the UAV 100 may request that the neighboring ground station 402b transmit its location to the UAV 100. The location of the neighboring ground station 402b may be expressed in three dimensional coordinates, for example as a latitude, a longitude, and an altitude. The UAV 100 may determine its own position using information from the vehicles avionics system and/or GPS or other geographical location systems. The position of the UAV 100 may be a set of three dimensional coordinates and an orientation, such as a latitude, a longitude, an altitude, and an orientation (e.g., pitch, roll, and yaw angles).

Using the determined location of the neighboring ground station 402b and the location and orientation of the UAV 100, a processor of the UAV may determine an orientation of the antenna 131 that points the antenna towards the neighboring ground station 402b. For example, the UAV 100 may calculate a vector between the position of the UAV 100 and the location of the neighboring ground station 402b. The antenna 131 may then be oriented to align with the calculated vector and establish a communications link 406 with the neighboring ground station 402b. The UAV 100 may conduct signal measurements of a pilot or reference signal transmitted by the neighboring ground station 402b during the determined time period. Once the period for conducting signal measurements has elapsed, the UAV 100 may orient the antenna back to the serving ground station 402a and resume the bi-directional communications link 404.

In some embodiments, the ground station 402b may be configured to steer a beam towards the UAV 100 during the determined time period for conducting signal measurements by the UAV. The network, through the serving ground station 402a, may know the location of the UAV 100 at the determined time. The neighboring ground station 402*b* may orient one of its antennas towards the UAV 100 at the determined time, for example through electronic steering of a phased array antenna. The neighboring ground station 402*b* and the UAV 100 may establish the communications link 406 and transmit a pilot or reference signal to the UAV 100. Dynamic beam steering by a neighboring ground station 402*b* may allow the UAV 100 to increase the accuracy of the measured signal quality, particularly for communication links supported by directional antenna steering by the UAV 100 and/or the neighboring ground station 402*b*.

After conducting the signal measurements, the UAV 100 may report the results to the network via either the serving ground station 402*a* or the neighboring ground station 402*b*. The UAV 100 and the network may determine one or more time periods for reporting of the signal measurements. During the determined time period for reporting signal measurements by the UAV 100, the UAV 100 may transmit the signal measurements to the serving ground station 402*a* through the bi-directional communications link 404, or dynamically orient the antenna 131 toward the serving ground station 402*a* and transmit the signal measurements through the communications link 406 as described. After the determined time period for conducting signal measurements by the UAV 100 has elapsed, the UAV 100 may orient the antenna 131 back to the serving ground station 402*a*.

After conducting the signal measurements and reporting the results, the UAV 100 and/or the network may determine whether a handover should be performed. For example, a handover from the serving ground station 402*a* to the neighboring ground station 402*b* may be beneficial if the signal strength received from the neighboring ground station 402*b* is stronger than the signal strength received from the serving ground station 402*a*. When a handover is performed, the UAV 100 may orient its antenna 131 to the neighboring ground station 402*b* and establish a full bi-directional communications link (406). The ground station 402*b* becomes the serving ground station, and the previous serving ground station 402*a* becomes a neighboring ground station.

Figure 5:
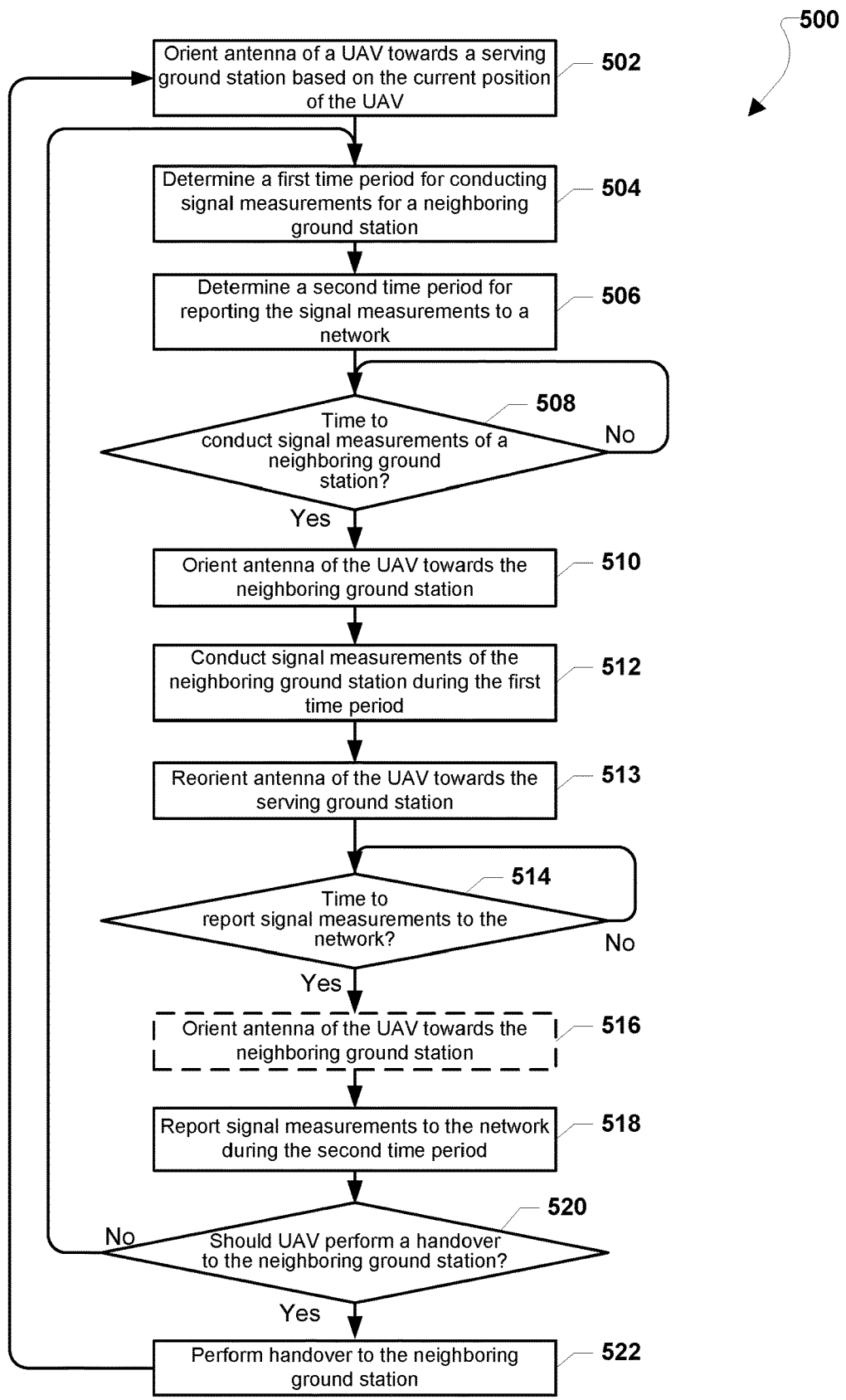
FIG. 5 is a process flow diagram illustrating a method for dynamic antenna steering on a UAV according to various embodiments.

FIG. 5 illustrates a method 500 for dynamic antenna steering on a UAV according to various embodiments. With reference to FIGS. 1-5, the operations of the method 500 may be performed by a processor (e.g., the processor 120) of a UAV (e.g., the UAV 100).

Figure 6:
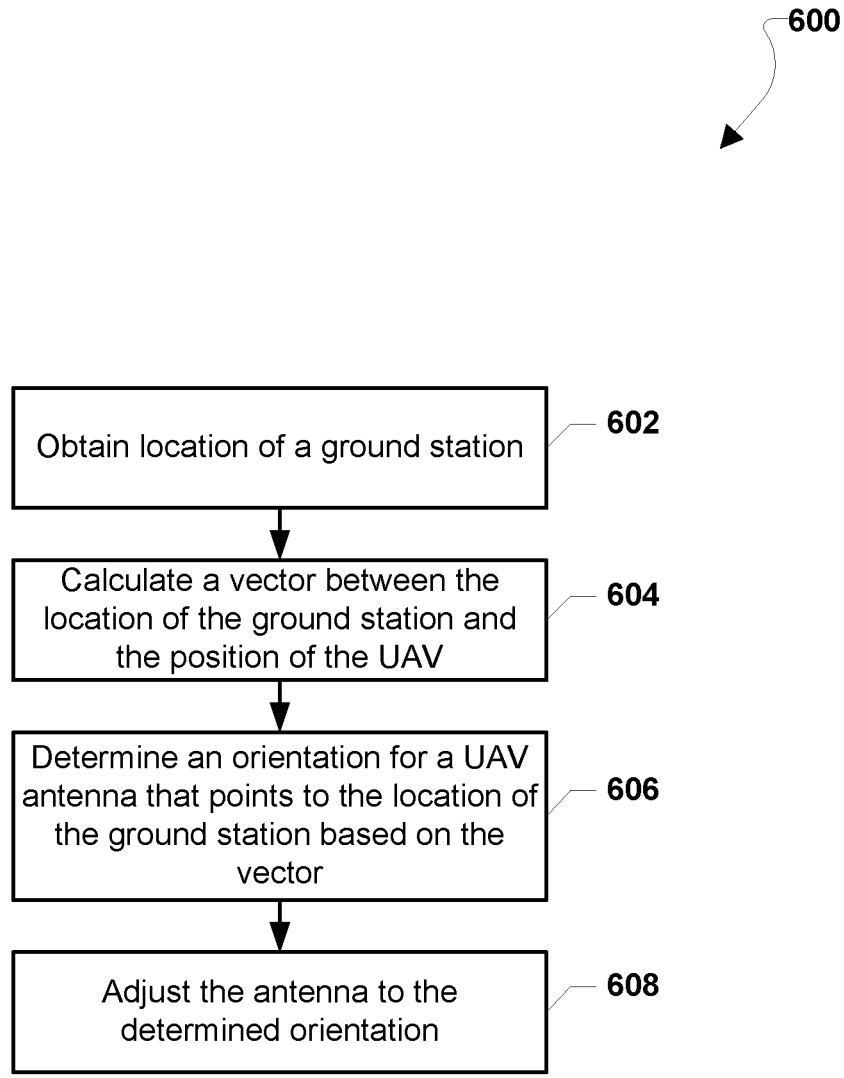
FIG. 6 is a process flow diagram illustrating a method for orienting an antenna on a UAV according to various embodiments.

In block 502, the processor may orient an antenna of the UAV towards a serving ground station based on the current position of the UAV. The serving ground station may be a base station that the UAV is connected to in order to receive and transmit information with a wireless communications network (e.g., a mobile telephony network). The UAV may include one or more antennas (e.g., the antenna 131) that are adjustable to point in different directions through mechanical steering mechanisms (e.g., a gimbal) or electrical steering (e.g., a phased array) techniques. For example, in block 502, UAV may determine the location of the serving ground station and its own position, and determine an orientation for the antenna so that the antenna points towards the serving ground station. The UAV and the network may establish a bi-directional communications link via the serving ground station. Methods for dynamically orienting the antenna on the UAV towards a ground station are described in more detail with reference to the method 600 (FIG. 6).

In block 504, the processor may determine a first time period for conducting signal measurements of one or more neighboring ground stations (i.e., ground stations that are adjacent to the serving ground station). The UAV may be moving relative to a number of ground stations belonging to the same network, including the serving ground station. The UAV and the network may schedule times to perform periodic signal measurements of neighboring ground stations to determine whether there should be a handover of service from the serving ground station to a neighboring ground station (e.g., if the UAV is traveling away from the serving ground station and towards a neighboring ground station). The UAV and the network may communicate via the serving ground station to determine the first time period.

In block 506, the processor may determine a second time period for reporting signal measurements to the network. The UAV and the network may schedule times to transmit the results of signal measurements of neighboring ground stations from the UAV to the network via either the serving ground station or a neighboring ground station. The UAV and the network may communicate via the serving ground station to determine the second time period.

In determination block 508, the processor may determine whether it is time for conducting signal measurements of a neighboring ground station, such as by comparing current time as maintained in an internal clock to the first time period for conducting signal measurements determined in block 504. Before that time (i.e., as long as determination block 508="No"), the UAV may continue to communicate via the serving ground station.

In response to determining that it is time to conduct signal measurements of a neighboring ground station (i.e., determination block 508="Yes"), the processor may orient the antenna of the UAV towards the neighboring ground station in block 510. Methods for dynamically orienting the antenna on the UAV towards a ground station are described in more detail with reference to the method 600.

In block 512, the processor may conduct signal measurements of the neighboring ground station during the first time period. The neighboring ground station may transmit a pilot or reference signal to the UAV. The antenna on the UAV may receive the signal and the processor may measure the signal strength and other attributes of the received signal. When the first time period for conducting signal measurements has expired, the processor may orient the antenna back to the serving ground station and continue communicating with the network via the serving ground station in block 513.

The processor may determine whether the second time for reporting signal measurements to the network has arrived in determination block 514, such as by comparing current time as maintained in an internal clock to the second time period for reporting signal measurements determined in block 506. Before that time (i.e., as long as determination block 514="No"), the UAV may continue to communicate via the serving ground station while monitoring the time.

In response to determining that it is time period for reporting signal measurements to the network (i.e., determination block 514="Yes"), the processor may optionally orient the antenna of the UAV towards the neighboring ground station in block 516 if the measurement reports are to be transmitted to the neighboring ground station instead of the serving ground station. If the measurement reports are to be transmitted to the serving ground station, no reorientation of the antenna may be required.

In block 518, the processor may report the signal measurements to the network during the second time period. For example, the processor may transmit the signal measurements to the serving ground station through the established bi-directional communications link, or dynamically orient the antenna to the neighboring ground station in optional block 516 before transmitting the signal measurements to the neighboring ground station. These reports may be used by the UAV and/or the network to control handover, neighbor-list management and other mobility features.

In determination block 520, the processor may determine whether the UAV should perform a handover to a neighboring ground station. For example, UAV may receive a signal from the network directing a handover to the neighboring ground station. In some embodiments, the processor may determine that a handover to the neighboring ground station should occur, such as when the received signal of a neighboring ground station is stronger than the signal from the serving ground station or a network connection via the serving ground station has been lost.

In response to determining that the UAV should not perform a handover to the neighboring ground station (i.e., determination block 520="No"), the processor may continue communicating with the serving ground station and again determine a first time period for conducting signal measurements of one or more neighboring ground stations in block 504, and a second time period for reporting signal measurements to the network in block 506. In other words, when there is no handover the UAV continues dynamically orienting the antenna toward the serving ground station until the next time that a neighboring ground station signal measurement is to be conducted.

In response to determining that the UAV should perform a handover to the neighboring ground station (i.e., determination block 520="Yes"), the processor may perform a handover from the serving ground station to the neighboring ground station in block 522. For example, the processor may detach from the serving ground station, orient the antenna towards the neighboring ground station to establish a bi-directional communications link in block 502 by which the previous neighboring ground station becomes the serving ground station. The method 500 may be performed in a periodic manner to enable a UAV to dynamically orient an antenna on the UAV towards two or more ground stations for communications, and signal measurements, as well as performing handovers between ground stations.

FIG. 6 illustrates a method 600 for orienting an antenna on a UAV according to various embodiments. With reference to FIGS. 1-6, the operations of the method 600 may be performed by a processor (e.g., the processor 120) of a UAV (e.g., the UAV 100).

In block 602, the processor may obtain the location of a ground station. The UAV may communicate with the ground station to receive navigation assistance and other information. The UAV may communicate with the ground station using an antenna (e.g., the antenna 131) that transmits and receives a RF communications beam with the ground station. The ground station may be, for example, a mobile telephony network base station (e.g., an eNodeB), a UAV controller, or a server. The ground station may be a serving ground station (i.e., the ground station that is currently providing communications services to the UAV) or a neighboring ground station belonging to the network. The UAV may request the ground station transmit its location to the UAV, or the UAV may store the location of the ground station in memory (e.g., the memory unit 121).

In block 604, the processor may calculate a vector between the position of the UAV and the location of the ground station. For example, the processor may determine the current position of the UAV, which may include a set of three dimensional coordinates and an orientation, such as a latitude, a longitude, an altitude, and an orientation (e.g., pitch, roll, and yaw). The processor may then calculate the vector, which may represent a straight, line-of-sight vector between the UAV and the ground station.

In block 606, the processor may determine an orientation for the UAV antenna that points to the location of the ground station based on the vector. For example, the processor may determine an orientation for the antenna that aligns with the vector so that the antenna points towards the ground station.

In block 608, the processor may adjust the antenna to the determined orientation. The orientation of the antenna may be adjusted via mechanical or electronic methods, or the UAV may change its attitude and orientation in order to point a fixed antenna in the determined orientation. In some embodiments, the antenna may be attached to a gimbal that allows the antenna to be pointed in various directions independent of the rest of the UAV, and the operations in block 608 may involve actuating the gimbal to physically point the antenna in the determined orientation. In some embodiments, the antenna may be fixed and include a phased array that the processor uses to electronically steer the beam of the antenna in the determined direction. In some embodiments, the antenna may be fixed on the UAV and the processor may point the antenna in the determined direction by adjusting the orientation of the UAV. For example, the processor may direct a flight control unit to rotate the UAV so that the antenna points in the determined direction, such as by causing a multi-rotor UAV to fly with a particular orientation. The processor may periodically re-determine the location of the ground station in order to realign the antenna or reorient the UAV so as to keep the antenna pointed at the ground station as the UAV moves relative to the ground station (i.e., repeat the operations in blocks 602-608). In this manner, the method 600 provides a way to dynamically adjust the orientation of a UAV antenna to increase the strength of the communications link with a ground station.

Figure 7:
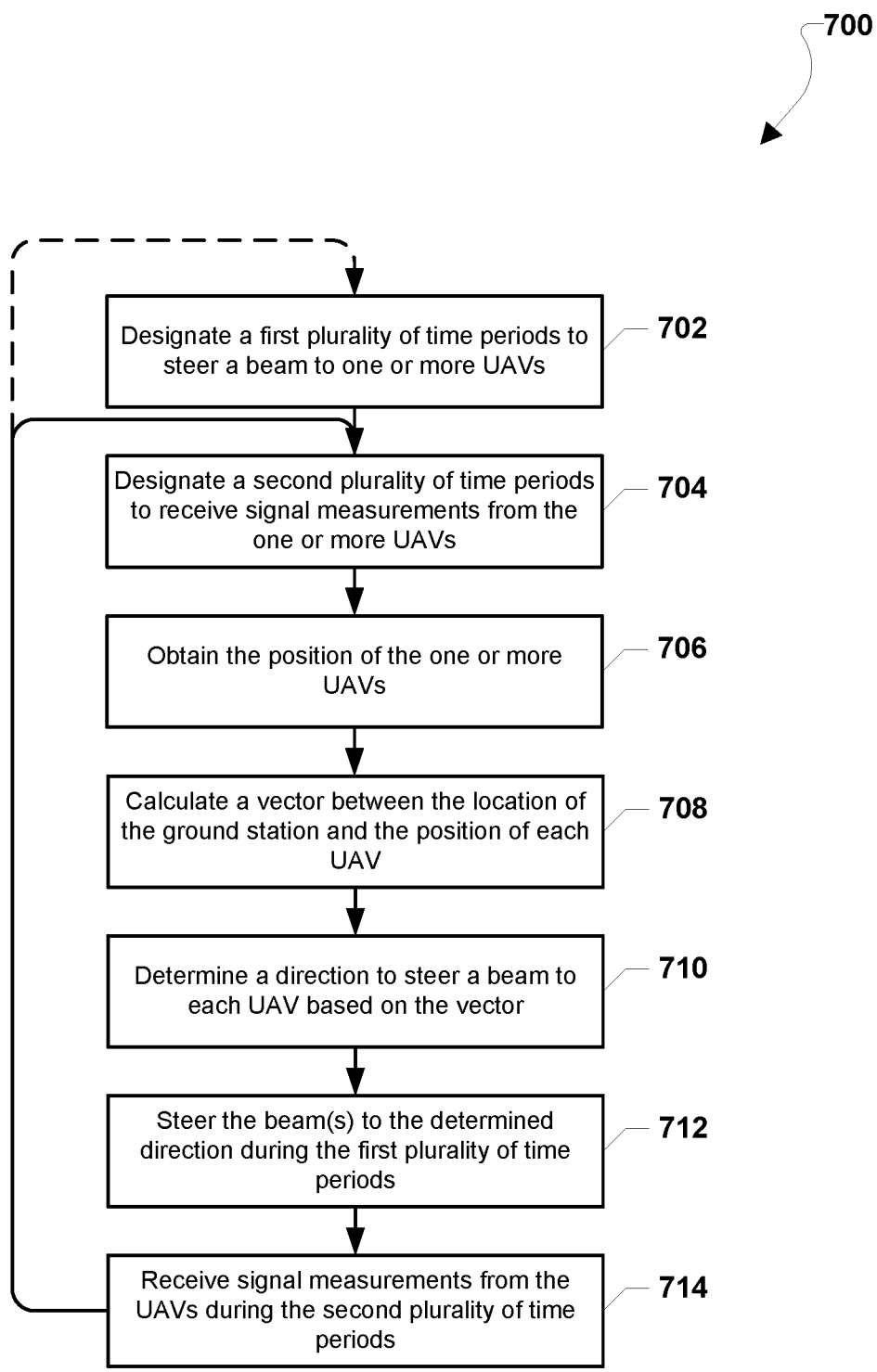
FIG. 7 is a process flow diagram illustrating a method for dynamic beam steering at a ground station according to various embodiments.

FIG. 7 illustrates a method 700 for beam steering by a ground station to orient a transmission beam towards a UAV according to various embodiments. With reference to FIGS. 1-7, the operations of the method 700 may be performed by a processor (e.g., the processor 202) of a ground station (e.g., the ground station 200). The ground station may be, for example, a mobile telephony network base station (e.g., an eNodeB), a UAV controller, or a server.

In block 702, the processor may determine a first plurality of time periods to steer a beam to one or more UAVs. The ground station may act as a serving ground station for one or more UAVs, and as a neighboring ground station for one or more other UAVs. When acting as a serving ground station, the ground station may establish a communications link and provide navigation assistance and other information to the UAVs. When acting as a neighboring ground station, the ground station may transmit pilot or reference signals to UAVs so that the UAVs may conduct signal measurements for handover purposes. The ground station may communicate with the UAVs using one or more antennas (e.g., the antenna 208) that transmit and receive RF communications with the UAVs. The ground station and each UAV may determine periodic time periods for the ground station to transmit information or a pilot signal to the UAV.

In block 704, the processor may determine a second plurality of time periods to receive signal measurements from one or more UAVs. The ground station may receive signal measurements from one or more UAVs, which are used by the UAV and/or the network to determine handover decisions between ground stations. The ground station and each UAV may determine periodic time periods for the UAV to transmit the signal measurements to the ground station.

In block 706, the processor may obtain the location of one or more UAVs. Each UAV may periodically transmit its position to the ground station, such as in the form of a set of three dimensional coordinates such as a latitude, a longitude, an altitude, and may include other information such as an orientation of the UAV (e.g., pitch, roll, and yaw), a flight direction of the UAV, and speed of the UAV.

In block 708, the processor may determine a vector between the position of each UAV and the location of the ground station. The vector may represent a straight, line-of-sight direction from ground station to the UAV. Such a vector may be determined based on the known geographic coordinates of the ground station and the obtained location of the UAV.

In block 710, the processor may determine a direction to steer the beam towards each UAV based on the vector between the ground station and each UAV. For example, the determined steering direction of the beam may align with the vector determined in block 708. In some embodiments, the operations of blocks 708 and 710 may be combined into a single determination of a steering direction for the ground station antenna(s).

In block 712, the processor may steer the antenna(s) to direct an RF beam towards each UAV based on the direction determined in block 710 during the first plurality of time periods. In some embodiments, the ground station antenna(s) may include a phased array, in which case the processor may steer the antenna beams electronically toward each UAV independently. In some embodiments, the ground station antenna(s) may be physically steerable, in which case the processor may control a steering mechanism in order to point the antenna(s) toward each UAV. With respect to UAVs for which the ground station is acting as a serving ground station, the beam may include navigation assistance information and other information that the UAV may utilize while traveling. With respect to UAVs for which the ground station is acting as a neighboring ground station, the beam may include a pilot or reference signal that the UAV may use to conduct signal measurements.

In block 714, the processor may receive signal measurements from the one or more UAVs during the second plurality of time periods. This information may be reported to the network. The UAV and/or the network may utilize the signal measurement information to determine whether any handovers should be performed for any of the UAVs.

The processor may periodically repeat the operations in blocks 702-714 in order to realign the antenna(s) so as to keep the antenna(s) pointed at each UAV as the UAVs moves relative to the ground station and to transmit and receive information from each UAV. Thus, the method 700 provides a way for a ground station to implement dynamic beam steering to one or more UAVs.

Figure 8:
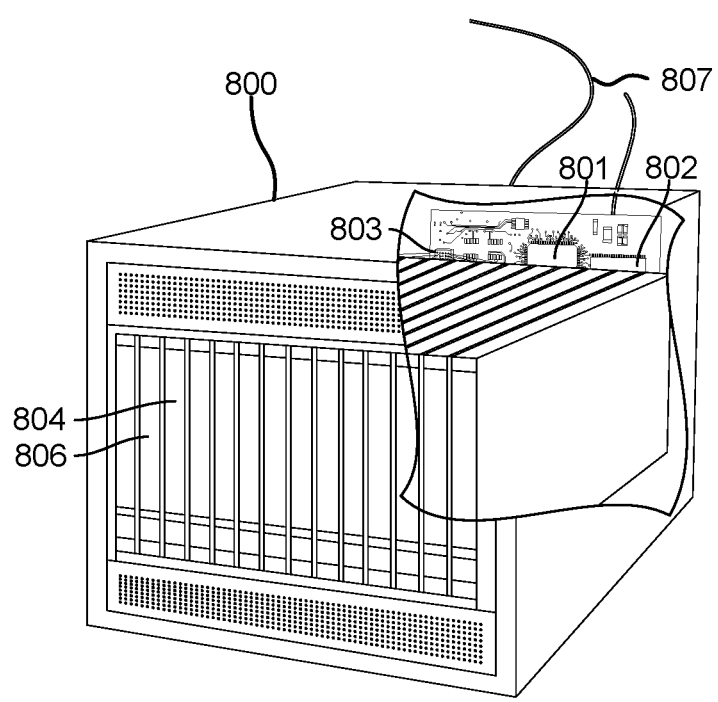
FIG. 8 is a component block diagram of a ground station suitable for use with various embodiments.

The various embodiments may also be implemented on any of a variety of ground stations, such as the ground station 800 illustrated in FIG. 8. With reference to FIGS. 1-8, the ground station 800 typically includes a processor 801 coupled to volatile memory 802 and a large capacity non-volatile memory, such as a disk drive 804. The ground station 800 may also include a floppy disc drive, compact disc (CD) or digital versatile disc (DVD) disc drive 806 coupled to the processor 801. The ground station 800 may also include network access ports 803 coupled to the processor 801 for establishing network interface connections with a network 807, such as a local area network coupled to other broadcast system computers and servers, the Internet, the public switched telephone network, and/or a cellular data network. Examples of mobile telephony networks include Third Generation (3G), Fourth Generation (4G), Long Term Evolution (LTE), Time Division Multiple Access (TDMA), Code Division Multiple Access (CDMA), CDMA 2000, Wideband CDMA (WCDMA), Global System for Mobile Communications (GSM), Single-Carrier Radio Transmission Technology (1×RTT), and Universal Mobile Telecommunications Systems (UMTS).

Figure 9:
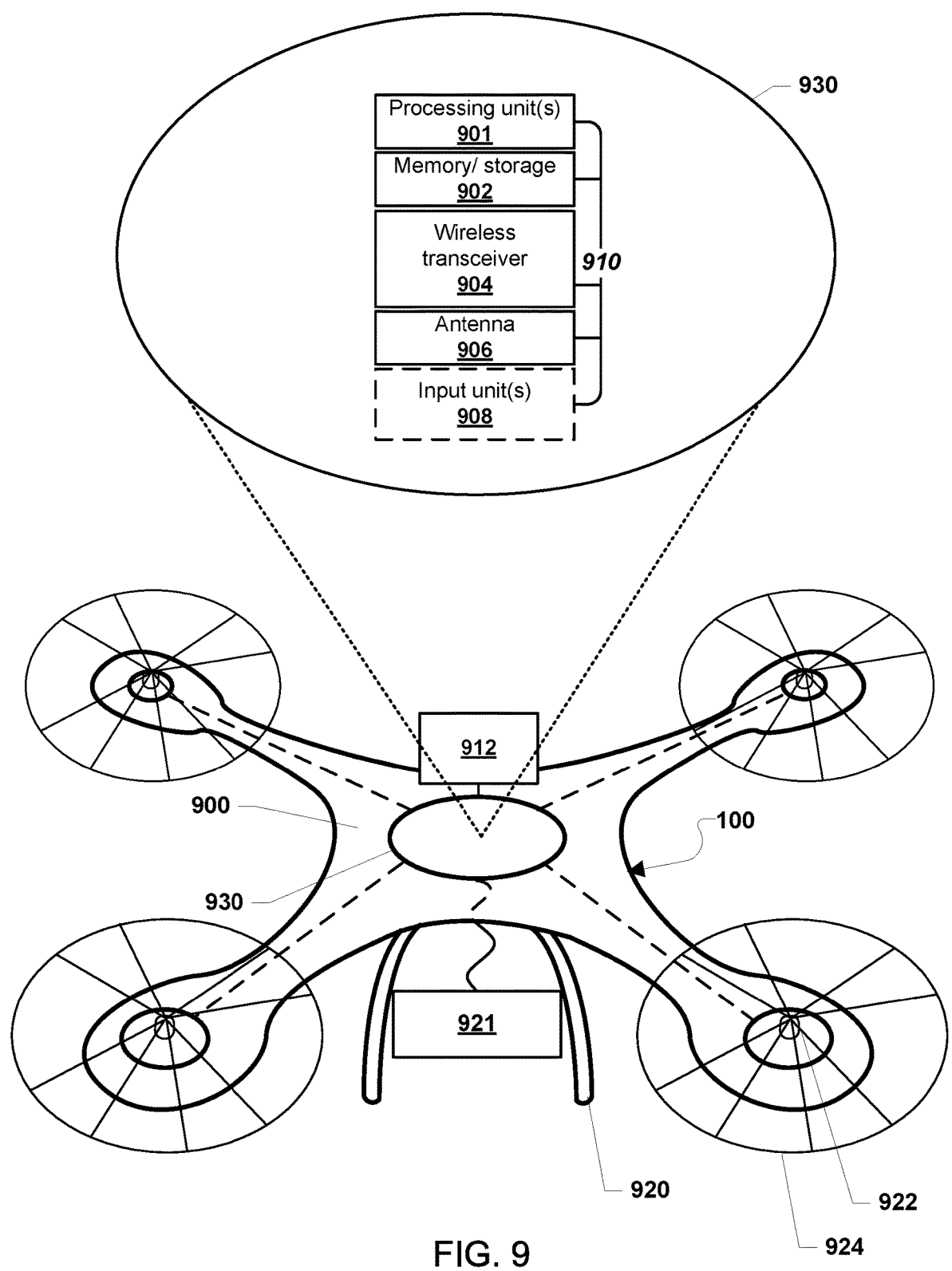
FIG. 9 is a component block diagram of a UAV suitable for use with various embodiments.

Various embodiments may be implemented within a variety of UAVs, an example of which in the form of a four-rotor UAV is illustrated in FIG. 9 that is suitable for use with various embodiments. With reference to FIGS. 1-9, the UAV 100 may include a body 900 (i.e., fuselage, frame, etc.) that may be made out of any combination of plastic, metal, or other materials suitable for flight. The body 900 may include a processor 930 that is configured to monitor and control the various functionalities, subsystems, and/or other components of the UAV 100. For example, the processor 930 may be configured to monitor and control various functionalities of the UAV 100, such as any combination of modules, software, instructions, circuitry, hardware, etc. related to propulsion, navigation, power management, sensor management, and/or stability management.

The processor 930 may include one or more processing unit(s) 901, such as one or more processors configured to execute processor-executable instructions (e.g., applications, routines, scripts, instruction sets, etc.), a memory and/or storage unit 902 configured to store data (e.g., flight plans, obtained sensor data, received messages, applications, etc.), and a wireless transceiver 904 and antenna 906 for transmitting and receiving wireless signals (e.g., a Wi-Fi® radio and antenna, Bluetooth®, RF, etc.). In some embodiments, the UAV 100 may also include components for communicating via various wide area networks, such as cellular network transceivers or chips and associated antenna (not shown). In some embodiments, the processor 930 of the UAV 100 may further include various input units 908 for receiving data from human operators and/or for collecting data indicating various conditions relevant to the UAV 100. For example, the input units 908 may include camera(s), microphone(s), location information functionalities (e.g., a global positioning system (GPS) receiver for receiving GPS coordinates), flight instruments (e.g., attitude indicator(s), gyroscope(s), accelerometer(s), altimeter(s), compass(es), etc.), keypad(s), etc. The various components of the processor 930 may be connected via a bus 910 or other similar circuitry.

The body 900 may include landing gear 920 of various designs and purposes, such as legs, skis, wheels, pontoons, etc. The body 900 may also include a payload mechanism 921 configured to hold, hook, grasp, envelope, and otherwise carry various payloads, such as boxes. In some embodiments, the payload mechanism 921 may include and/or be coupled to actuators, tracks, rails, ballasts, motors, and other components for adjusting the position and/or orientation of the payloads being carried by the UAV 100. For example, the payload mechanism 921 may include a box moveably attached to a rail such that payloads within the box may be moved back and forth along the rail. The payload mechanism 921 may be coupled to the processor 930 and thus may be configured to receive configuration or adjustment instructions. For example, the payload mechanism 921 may be configured to engage a motor to re-position a payload based on instructions received from the processor 930.

The UAV 100 may be of a helicopter design that utilizes one or more rotors 924 driven by corresponding motors 922 to provide lift-off (or take-off) as well as other aerial movements (e.g., forward progression, ascension, descending, lateral movements, tilting, rotating, etc.). The UAV 100 may utilize various motors 922 and corresponding rotors 924 for lifting off and providing aerial propulsion. For example, the UAV 100 may be a "quad-copter" that is equipped with four motors 922 and corresponding rotors 924. The motors 922 may be coupled to the processor 930 and thus may be configured to receive operating instructions or signals from the processor 930. For example, the motors 922 may be configured to increase rotation speed of their corresponding rotors 924, etc. based on instructions received from the processor 930. In some embodiments, the motors 922 may be independently controlled by the processor 930 such that some rotors 924 may be engaged at different speeds, using different amounts of power, and/or providing different levels of output for moving the UAV 100. For example, motors 922 on one side of the body 900 may be configured to cause their corresponding rotors 924 to spin at a higher rotations per minute (RPM) than rotors 924 on the opposite side of the body 900 in order to balance the UAV 100 burdened with an off-centered payload.

The body 900 may include a power source 912 that may be coupled to and configured to power the various other components of the UAV 100. For example, the power source 912 may be a rechargeable battery for providing power to operate the motors 922, the payload mechanism 921, and/or the units of the processor 930.

The various processors described herein may be any programmable microprocessor, microcomputer or multiple processor chip or chips that can be configured by software instructions (applications) to perform a variety of functions, including the functions of various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable software, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read only memory (ROM), electrically erasable programmable ROM (EEPROM), FLASH memory, compact disc ROM (CD-ROM) or other optical disk storage, magnetic disk storage or other magnetic storage smart objects, or any other medium that may be used to store desired program code in the form of instructions or data structures and that may be accessed by a computer. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of memory described herein are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. An unmanned aerial vehicle (UAV) having an antenna, comprising:
a processor coupled to the antenna and configured with processor-executable instructions to:
orient the antenna towards a serving ground station based on a current position of the UAV;
orient the antenna towards a neighboring ground station when it is time to conduct signal measurements of the neighboring ground station;
conduct the signal measurements of the neighboring ground station while orienting the antenna towards the neighboring ground station;
determine whether signals of the neighboring ground station are stronger than signals of the serving ground station based on the signal measurements of the neighboring ground station while orienting the antenna towards the neighboring ground station; and
perform a handover to the neighboring ground station in response to determining that the signals of the neighboring ground station are stronger than signals of the serving ground station.

2. The UAV of claim 1, wherein the processor is further configured with processor-executable instructions to orient the antenna on the UAV towards the serving ground station based on the current position of the UAV by:
obtaining a location of the serving ground station;
calculating a vector between the location of the serving ground station and the current position of the UAV;
determining an orientation for the antenna that points to the location of the serving ground station based on the vector; and
adjusting the antenna to the determined orientation.

3. The UAV of claim 1, wherein the processor is further configured with processor-executable instructions to orient the antenna to the determined orientation by mechanically steering the antenna.

4. The UAV of claim 1, wherein the processor is further configured with processor-executable instructions to orient the antenna to the determined orientation by electronically steering the antenna.

5. The UAV of claim 1, wherein the processor is further configured with processor-executable instructions to orient the antenna to the determined orientation by adjusting an orientation of the UAV.

6. The UAV of claim 1, wherein the processor is further configured with processor-executable instructions to:
determine whether it is time to report the signal measurements to a network; and
report the signal measurements to the network via the serving ground station in response to determining that it is time to report the signal measurements to a network.

7. The UAV of claim 1, wherein the processor is further configured with processor-executable instructions to:
determine whether it is time to report the signal measurements to a network;
orient the antenna to the neighboring ground station in response to determining that is time to report the signal measurements to the network; and
report the signal measurements to the network via the neighboring ground station.

8. The UAV of claim 1, wherein the processor is further configured with processor-executable instructions to orient the antenna towards the neighboring ground station by:
obtaining a location of the neighboring ground station;
calculating a vector between the location of the neighboring ground station and the current position of the UAV, wherein the current position of the UAV comprises a three-dimensional coordinate and an orientation;
determining an orientation for the antenna that points to the location of the neighboring ground station based on the vector; and
adjusting the antenna to the determined orientation.

9. A ground station, comprising:
a plurality of antennas; and
a processor coupled to the plurality of antennas and configured with processor-executable instructions to:
receive signal measurements from an unmanned aerial vehicle (UAV) of signals between the UAV and a neighboring ground station while an antenna of the UAV is oriented toward each of the one or more neighboring ground stations and of signals between the UAV and a serving ground station;
determine, from the received signal measurements, whether signals of the neighboring ground station are stronger than signals of the serving ground station based on the received signal measurements; and
transmit instructions to the UAV to perform a handover to the neighboring ground station in response to determining that the signals of the neighboring ground station are stronger than signals of the serving ground station.

10. The ground station of claim 9, wherein the processor is further configured with processor-executable instructions to:
determine a first time to steer at least one of the plurality of antennas of the ground station toward the UAV; and
steering the at least one of the plurality of antennas toward the UAV at the first time.

11. The ground station of claim 9, wherein the processor is further configured with processor-executable instructions to:
determine a second time for receiving signal measurements; and
steer the at least one of the plurality of antennas toward the UAV at the second time for receiving signal measurements from the UAV.

12. A non-transitory computer readable storage medium having stored thereon processor-executable software instructions configured to cause a processor of an unmanned aerial vehicle (UAV) to perform operations comprising:
orienting an antenna on the UAV towards a serving ground station based on a current position of the UAV;
orienting the antenna towards a neighboring ground station when it is time to conduct signal measurements of the neighboring ground station;
conducting the signal measurements of the neighboring ground station while orienting the antenna towards the neighboring ground station;
determining whether signals of the neighboring ground station are stronger than signals of the serving ground station based on the signal measurements of the neighboring ground station while orienting the antenna towards the neighboring ground station; and performing a handover to the neighboring ground station in response to determining that the signals of the neighboring ground station are stronger than signals of the serving ground station.

13. An unmanned aerial vehicle (UAV), comprising:

means for orienting an antenna on the UAV towards a serving ground station based on a current position of the UAV;

means for orienting the antenna towards a neighboring ground station when it is time to conduct signal measurements of the neighboring ground station;

means for conducting the signal measurements of the neighboring ground station while orienting the antenna towards the neighboring ground station;

means for determining whether signals of the neighboring ground station are stronger than signals of the serving ground station based on the signal measurements of the neighboring ground station while orienting the antenna towards the neighboring ground station; and means for performing a handover to the neighboring ground station in response to determining that the signals of the neighboring ground station are stronger than signals of the serving ground station.

\* \* \* \* \*